(12) United States Patent  
Kawakami et al.

(10) Patent No.: US 9,020,361 B2
(45) Date of Patent: Apr. 28, 2015

(54) OPTICAL SIGNAL TRANSMITTER, AND BIAS VOLTAGE CONTROL METHOD

(75) Inventors: Hiroto Kawakami, Yokosuka (JP); Eiji Yoshida, Yokosuka (JP); Masahiro Tachibana, Yokohama (JP)

(73) Assignees: Nippon Telegraph and Telephone Corporation, Tokyo (JP); NTT Electronics Corporation, Yokohama-shi (JP)

( * ) Notice: Subject to any disclaimer, the term of this patent is extended or adjusted under 35 U.S.C. 154(b) by 201 days.

(21) Appl. No.: 13/393,101

(22) PCT Filed: Sep. 7, 2010

(86) PCT No.: PCT/JP2010/065340
§ 371 (c)(1),
(2), (4) Date: Feb. 28, 2012

(87) PCT Pub. No.: WO2011/030763
PCT Pub. Date: Mar. 17, 2011

(65) Prior Publication Data
US 2012/0155865 A1    Jun. 21, 2012

(30) Foreign Application Priority Data
Sep. 8, 2009  (JP) ................... 2009-207108

(51) Int. Cl.
*H04B 10/04* (2006.01)
*G02F 1/01* (2006.01)
*H04B 10/50* (2013.01)

(52) U.S. Cl.
CPC ........ *G02F 1/0123* (2013.01); *H04B 10/50572* (2013.01); *H04B 10/5057* (2013.01)

(58) Field of Classification Search
CPC ...................................................... G02F 1/0123
USPC ................................................. 398/195, 198
See application file for complete search history.

(56) References Cited

U.S. PATENT DOCUMENTS

| | | | |
|---|---|---|---|
| 6,539,038 B1* | 3/2003 | Wilkerson et al. | 372/38.02 |
| 6,970,655 B2* | 11/2005 | Ono et al. | 398/186 |
| 7,251,417 B2* | 7/2007 | Fishman et al. | 398/189 |
| 7,394,992 B2* | 7/2008 | Kimmitt et al. | 398/185 |
| 7,546,041 B2* | 6/2009 | Griffin | 398/188 |
| 7,551,858 B2* | 6/2009 | Wan et al. | 398/183 |
| 7,657,190 B2* | 2/2010 | Akiyama | 398/195 |
| 7,840,141 B2* | 11/2010 | Tanaka et al. | 398/198 |
| 7,936,996 B2* | 5/2011 | Kawanishi et al. | 398/186 |
| 7,986,885 B2* | 7/2011 | Mamyshev | 398/188 |
| 8,041,228 B2* | 10/2011 | Charlet et al. | 398/158 |
| 8,095,018 B2* | 1/2012 | Sekine et al. | 398/198 |
| 8,145,069 B2* | 3/2012 | Tanaka et al. | 398/198 |
| 8,400,702 B2* | 3/2013 | Tanaka et al. | 359/239 |
| 8,582,980 B2* | 11/2013 | Nishihara et al. | 398/188 |
| 8,582,981 B2* | 11/2013 | Akiyama et al. | 398/188 |
| 8,842,998 B2* | 9/2014 | Delfyett et al. | 398/188 |
| 2001/0007508 A1* | 7/2001 | Ooi et al. | 359/245 |
| 2003/0067647 A1* | 4/2003 | Wan et al. | 359/124 |
| 2003/0067651 A1* | 4/2003 | Wan et al. | 359/133 |
| 2005/0058461 A1* | 3/2005 | Lee et al. | 398/198 |
| 2005/0100346 A1* | 5/2005 | Kim et al. | 398/188 |
| 2005/0117191 A1* | 6/2005 | Griffin | 359/245 |
| 2005/0191060 A1* | 9/2005 | Gronbach et al. | 398/183 |
| 2006/0263097 A1 | 11/2006 | Akiyama et al. | |
| 2006/0263098 A1* | 11/2006 | Akiyama et al. | 398/188 |
| 2007/0134006 A1* | 6/2007 | Krieg | 398/198 |
| 2007/0264028 A1* | 11/2007 | Yuki et al. | 398/183 |
| 2008/0080872 A1* | 4/2008 | Tanaka et al. | 398/186 |
| 2008/0181620 A1* | 7/2008 | Sasaki | 398/198 |
| 2008/0187324 A1 | 8/2008 | Akiyama et al. | |
| 2009/0185192 A1* | 7/2009 | Katsifolis et al. | 356/483 |
| 2009/0234508 A1* | 9/2009 | Kallfass et al. | 700/282 |
| 2010/0021182 A1* | 1/2010 | Asano et al. | 398/188 |
| 2011/0013907 A1* | 1/2011 | Sugihara et al. | 398/38 |
| 2011/0229150 A1* | 9/2011 | Nishihara et al. | 398/195 |
| 2012/0155865 A1* | 6/2012 | Kawakami et al. | 398/43 |
| 2012/0155880 A1* | 6/2012 | Nishimoto et al. | 398/79 |
| 2012/0288284 A1* | 11/2012 | Yoshida et al. | 398/186 |
| 2013/0156444 A1* | 6/2013 | Akashi | 398/186 |
| 2013/0195394 A1* | 8/2013 | Hosokawa et al. | 385/3 |
| 2014/0168741 A1* | 6/2014 | Li et al. | 359/239 |
| 2014/0334829 A1* | 11/2014 | Akiyama | 398/186 |

FOREIGN PATENT DOCUMENTS

| | | |
|---|---|---|
| JP | 3-251815 A | 11/1991 |
| JP | 2642499 B2 | 8/1997 |
| JP | 2002-258228 A | 9/2002 |
| JP | 2007-043638 A | 2/2007 |
| JP | 2007-133176 A | 5/2007 |
| JP | 2008-092172 A | 4/2008 |
| JP | 2008-122786 A | 5/2008 |
| JP | 2008-197639 A | 8/2008 |

OTHER PUBLICATIONS

International Search Report for PCT/JP2010/065340, ISA/JP, mailed Nov. 22, 2010.

\* cited by examiner

*Primary Examiner* — Ken Vanderpuye
*Assistant Examiner* — Amritbir Sandhu
(74) *Attorney, Agent, or Firm* — Harness, Dickey & Pierce, P.L.C.

(57) ABSTRACT

An optical signal transmitter of the present invention includes: two phase modulating portions; a phase shifter which displaces carrier phases of two output lights from the phase modulating portions by $\pi/2$; a multiplexing portion which multiplexes two signal lights, carrier phases of the two signal lights being made orthogonal to each other by the phase shifter; a drive signal electrode portion which supplies a differential data signal to each of four paths of interference optical waveguides, each of the two phase modulating portions having the interference optical waveguides, the differential data signal having an amplitude which is equal to a half-wave voltage $V\pi$ of the two phase modulating portions; a drive amplifier which amplifies the differential data signal to be supplied to each of the four paths of the interference optical waveguides; a data bias electrode portion which supplies a total of four data bias voltages to two arms, each of the two phase modulating portions having the two arms; an orthogonal bias electrode portion which supplies an orthogonal bias voltage to the phase shifter; a data bias power supply portion that adjusts delay times in the two phase modulating portions by applying the data bias voltages to the data bias electrode portion; an orthogonal bias power supply portion that adjusts a delay amount relative to a light output from at least one of the two phase modulating portions by applying the orthogonal bias voltage to the orthogonal bias electrode portion; a dither signal adding portion that adds a dither signal to at most three of the four data bias voltages; a dither detecting portion which detects a wave that is n-times a dither component from an output of the multiplexing portion (where n is an integer equal to or greater than one); and an orthogonal bias control portion which feeds back a detection result of the dither detecting portion to the orthogonal bias power supply portion. The orthogonal bias power supply portion adjusts the delay amount relative to the light output from at least one of the two phase modulating portions by controlling the orthogonal bias voltage to be applied to the orthogonal bias electrode portion based on feedback from the orthogonal bias control portion.

12 Claims, 11 Drawing Sheets

US 9,020,361 B2

OPTICAL SIGNAL TRANSMITTER, AND BIAS VOLTAGE CONTROL METHOD

CROSS-REFERENCE TO RELATED APPLICATIONS

This application is a 371 U.S. National Stage of International Application No. PCT/JP2010/065340, filed Sep. 7, 2010. This application claims priority to Japanese Patent Application No. JP2009-207108, filed Sep. 8, 2009. The disclosures of the above applications are incorporated herein by reference.

TECHNICAL FIELD

The present invention relates to bias automatic control of an optical modulator. The present invention in particular relates to an optical signal transmitter for DQPSK (Differential Quadrature Phase Shift Keying) that transmits an optical DMPSK (Differential Multiple Phase-Shift Keying) signal, and a bias voltage control method therefor.

Priority is claimed on Japanese Patent Application No. 2009-207108, filed Sep. 8, 2009, the content of which is incorporated herein by reference.

BACKGROUND ART

As a transmission code used for an optical transmission system, the DMPSK (Differential Multiple Phase-Shift Keying) system with high nonlinear tolerance has been examined widely. In particular, a modulation system that combines a pulse carver with the DMPSK system and makes the intersymbol optical intensity 0 is effective. Hereinbelow, in order to simplify the explanation, a description shall be given limited to the DQPSK (Differential Quadrature Phase Shift Keying) modulation system, which is multiple value phase modulation involving four values. In the following explanation, negation (NOT) of the first data signal Data 1 and the second data signal Data 2 is expressed by placing a bar over each term in the drawings, but in the present description, they are expressed as bar (Data 1) and bar (Data 2).

FIG. 10 is a block diagram that shows a typical configuration example of a DQPSK modulator 100 for producing a DQPSK signal, according to the conventional art. CW light that is input to the DQPSK modulator is split into two by a first coupler 1. The two CW lights that have been split are respectively input to a first optical phase modulating portion 2-1 and a second optical phase modulating portion 2-2. These first and second optical phase modulating portions 2-1 and 2-2 are normally constituted by MZI (Mach-Zehnder Interferometer)-type optical intensity modulators. The first and second optical phase modulating portions 2-1 and 2-2 have a function that relatively changes by $\pi$ the optical phase in accordance with the logic of the first data signal Data 1, bar (Data 1) and the second data signal Data 2, bar (Data 2). The action of the first and second optical phase modulating portions 2-1 and 2-2 shall be described below.

The optical phase shifter 3 has an orthogonal bias electrode on which a third bias voltage described below is impressed. After the $\theta_3$ phase differential is added by this optical phase shifter 3, the outputs of the first and second optical phase modulating portions 2-1 and 2-2 are multiplexed by the second coupler 4, and output as a DQPSK signal. The best waveform is obtained by the $\theta_3$ being $\pm \pi/2$ in the case of DQPSK. This corresponds to $\frac{1}{4}$ of the carrier wavelength. Since the wavelength is generally of the micrometer order, adjustment is extremely severe. Since the optical quality of the DQPSK signal is sensitive to errors of the optical phase shifter 3, it is extremely important to adjust the delay of the optical phase shifter 3 to the correct value.

Generally, this adjustment is performed by adjusting the third bias voltage (also called the orthogonal bias voltage) $V_{bias3}$ that is supplied from the third bias power supply 5 to the optical phase shifter 3. The optical phase shifter 3 is, in FIG. 10, arranged at a subsequent stage of the second optical phase modulating portion 2-2, but is not limited thereto. The optical phase shifter 3 may also be arranged at a subsequent stage of the first optical phase modulating portion 2-1, or may be provided at the subsequent stage of both the first optical phase modulating portion 2-1 and the second optical phase modulating portion 2-2. Hereinbelow, in order to simplify the description, the description shall be given for the case of the optical phase shifter 3 being arranged only at a subsequent stage of the second optical phase modulating portion 2-2.

Next, the operation of the first and second optical phase modulating portions 2-1 and 2-2 shall be described. As mentioned above, an MZI-type optical intensity modulator is generally used for the first and second optical phase modulating portions 2-1 and 2-2. The first and second optical phase modulating portions 2-1 and 2-2 are respectively driven by first data signal Data 1, bar (Data 1) and second data signal Data 2, bar (Data 2). These data signals Data 1, bar (Data 1) and Data 2, bar (Data 2) are NRZ (Non Return-to-Zero) signals of 2 values. The first and second drive amplifiers 6-1 and 6-2 amplify the first and second data signals Data 1, bar (Data 1) and Data 2, bar (Data 2) in the two types of the signals and inverted signals.

The amplified data signals Data 1, bar (Data 1) and Data 2, bar (Data 2) are impressed via the first drive signal electrode 7-1 and the second drive signal electrode 7-2 to each of the two arms that the first and second optical phase modulating portions 2-1 and 2-2 have, to produce a phase shift of $\pm \phi_1$ and $\pm \phi_2$. When the data signal changes from the L level to the H level, it is necessary to change the phase delay ($\phi_1$ and $\phi_2$ approximately by $\pi$. That is to say, the amplitude of the output and the inverted output of the first and second drive amplifiers 6-1 and 6-2 each must approximately be the half-wave voltage $V\pi$ of the first and second optical phase modulating portions 2-1 and 2-2. Also, a DC voltage of $\pm V_{bias1}$ and $\pm V_{bias2}$ (data bias voltage, or differential bias) is produced by the first and second bias power supplies 8 and 9, and an optical phase shift of $\pm \theta_1$ and $\pm \theta_2$ is further added via the first data bias electrode 10-1 and the second data bias electrode 10-2.

The aforementioned half-wave voltage $V\pi$ shall be described. The MZI-type optical modulator is an interferometer that splits one optical signal into two, and after applying a slight delay to one, multiplexes these two lights again. When the amount of this delay is changed, the interference light of the two lights during multiplexing either becomes constructive or deconstructive. 'n' is an integer, and the wavelength iso $\lambda$. When the delay is equivalent to $n\lambda$, the interference light becomes strongest, and when the delay is equivalent to $(n+\frac{1}{2})$, the optical interference is quenched. Since 'n' is an arbitrary integer, when the delay amount further increases, the increase or decrease of the interference light is periodically repeated.

In the MZI-type optical modulator, the delay of the MZI is controlled by an electrical signal from outside. Generally, there is a proportional relation between the voltage of the electrical signal and the increase or decrease of the delay. The amount of increase of the voltage required for the delay to change from $n\lambda$ to $(n+\frac{1}{2})$ is called the half-wave voltage $V\pi$.

In the case of performing phase modulation with an MZI-type optical phase modulator, the total delay difference is modulated from (n−½)λ to (n+½)λ. For this reason, the electrical signal that is added to the modulator is required to have a voltage amplitude of 2×Vπ in total. In the case of using a differential input such as shown in FIG. 10, a voltage amplitude of Vπ may be imparted to each of the Data 1, bar (Data 1) and Data 2, bar (Data 2).

FIG. 11 is a diagram for describing the operation of the first optical phase modulating portion 2-1 by the prior art. In the following explanation, a non-essential optical delay that occurs from the optical phase change at the time of passage through the coupler, and the optical waveguide other than the interferometer is ignored. The electric field of light that has passed the first arm of the first optical phase modulating portion 2-1 is defined as $E_{1a}$, the electric field of light that has passed the second arm as $E_{1b}$, and the electric field of light that has been output from the first optical phase modulating portion 2-1 and just before being multiplexed by the second optical coupler 4 as $E_1$ (refer to FIG. 10). The optical electric fields of light $E_{1a}$, $E_{1b}$, and $E_1$ are sine waves that oscillate with the carrier frequency $\omega_c$. These optical electric fields of light $E_{1a}$, $E_{1b}$, and $E_1$ are denoted by a dashed line, a dashed dotted line, and a solid line in FIG. 11, respectively, with time shown along the horizontal axis.

Case (1)

The case of $\phi_1+\theta_1=0$ is shown in the topmost row of FIG. 11. At this time, the amplitude of the electric field $E_1$ of the output of the first optical phase modulating portion 2-1 is a maximum. The phases of the optical electric fields are in agreement at this time, with vertical arrows shown at the portions having the same phase for descriptive purposes.

That is to say, Case (1) shown in FIG. 11 shows the following case.
First arm: $\phi_1+\theta_1=0$
Second arm: $-\phi_1-\theta_1=0$
optical phase (relative value)=0
optical intensity of $E_1$ (relative value)=$|E_1|^2$=1

Case (2)

The case of $\phi_1+\theta_1=\pi/4$ is shown in the second row of FIG. 11. The optical electric fields $E_{1a}$, $E_{1b}$, are symmetrically shifted to the left and right on the time axis, and so the arrows are divided from left to right. The amplitude of the multiplexed optical electric field $E_1$ falls. However, since the shift amount is left-right symmetric, the position of the peak of the optical electric field $E_1$ is unchanged from the case of $\phi_1+\theta_1=0$.

That is to say, Case (2) that is shown in FIG. 11 shows the following case.
First arm: $\phi_1+\theta_1=\pi/4$
Second arm: $-\phi_1-\theta_1=-\pi/4$
optical phase (relative value)=0
optical intensity of $E_1$ (relative value)=$|E_1|^2$=0.5

Case (3)

The case of $\phi_1+\theta_1=\pi/2$ is shown in the third row of FIG. 11. Since optical electric fields $E_{1a}$ and $E_{1b}$ are opposite phases, the optical electric field $E_1$ is quenched.

That is to say, Case (3) that is shown in FIG. 11 shows the following case.
First arm: $\phi_1+\theta_1=\pi/2$
Second arm: $-\phi_1-\theta_1=-\pi/2$
optical intensity of $E_1$ (relative value)=$|E_1|^2$=0

Case (4)

The case of $\phi_1+\theta_1=3\pi/4$ is shown in the fourth row of FIG. 11. The optical electric field $E_1$ is not quenched, but compared with the first row and the second row, the phase thereof is shifted by π.

Case (5)

The case of $\phi_1+\theta_1=\pi$ is shown in the fifth row of FIG. 11. The amplitude of the optical electric field $E_1$ again becomes a maximum. In the fifth row, compared to the first row, the optical phase is shifted by π.

That is to say, Case (5) that is shown in FIG. 11 shows the following case.
First arm: $\phi_1+\theta_1=\pi$
Second arm: $-\phi_1-\theta_1=-\pi$
optical phase (relative value)=π
optical intensity of $E_1$ (relative value)=$|E_1|^2$=1

The power of the output of the optical phase modulating portion is proportional to the square of the absolute value of the electric field $E_1$, with that being proportion to $\cos(\phi_1+\theta_1)$.

Normally, the two logical values of the first data signal Data 1, bar (Data 1) respectively are made to correspond to the state of the first and fifth rows of FIG. 11, respectively, and the DQPSK optical modulator is used in the state of becoming a maximum optical output intensity. However, the relationship between the output voltage of the first drive amplifier 6-1 and $\phi_1$ is not self evident, and may change over time. The first data bias electrode 10-1 and the phase difference $\pm\theta_1$ that arises therefrom are used in order to correct this. For example, the output amplitude of the first drive amplifier 6-1 and the data bias voltage $V_{bias1}$ from the first bias power supply 8 are adjusted so as to become $\phi_1+\theta_1=0$ when the data signal is "0" and become $\phi_1+\theta_1=\pi$ when the data signal is "1". The same operation is performed for the second optical phase modulating portion 2-2.

As is clear in the foregoing explanation, provided the condition of supplying an antisymmetrical delay to the two arms is kept, the output lights of the first and second optical phase modulating portions 2-1 and 2-2 have the characteristics of (1) the optical intensity continuously changing and (2) the optical phase taking only two values that differ by π.

For reference, the case of driving the two arms asymmetrically shall be described. The "reference diagram" shown in the sixth row of FIG. 11 shows the case of asymmetrically changing the delay of the arms that is given in Case (5) of FIG. 11. The delay of the first and second arms was +π and −π in Case (5) of FIG. 11, but in the "reference diagram", is changed to 0 and −2π. It is evident that the optical electric field $E_1$ of the output light ends up becoming essentially the same as Case (1) of FIG. 11, and so phase modulation cannot be correctly performed.

That is to say, the reference diagram shown in FIG. 11 shows the following case.
First arm: $\phi_1+\theta_1=0$
Second arm: $-\phi_1-\theta_1=-2\pi$
optical phase (relative value)=0
optical intensity of $E_1$ (relative value)=$|E_1|^2$=1

The optical electric fields $E_1$ and $E_3$ of the two lights that are multiplexed by the second coupler 4 (refer to FIG. 10) are expressed in writing in the manner of the following Equations (1) and (2), if $\phi_1+\theta_1\equiv\Phi_1$, and $\phi_2+\theta_2\equiv\Phi_2$. Hereinbelow, proportionality coefficients that are not essential are omitted.

[Equation 1]

$$E_1=2\times\cos(\Phi_1)\exp(i\omega_c\cdot t) \qquad (1)$$

[Equation 2]

$$E_3=2\times\cos(\Phi_2)\exp(i\omega_c\cdot t+i\theta_3) \qquad (2)$$

The average value of the output power of the DQPSK optical modulator is given by the following Equation (3).

[Equation 3]

$$|E_1+E_3|^2 = 2 + \cos(2\Phi_1) + \cos(2\Phi_2) + 4\cdot\cos(\Phi_1)\cdot\cos(\Phi_2)\cdot\cos(\theta_3) \quad (3)$$

Next, the conditions that are required for control of the data bias voltages $V_{bias1}$ and $V_{bias2}$ shall be described. As stated above, with regard to the adjustment of the data bias voltages $V_{bias1}$ and $V_{bias2}$, the object is for the values of $\Phi_1$ and $\Phi_2$ to take the two values of 0 or $\pi$ in accordance with the sign of the data. The adjustment of the data bias voltages $V_{bias1}$ and $V_{bias2}$ may be controlled so as to maximize the second term and third term of Equation (3). As is well known, this can be achieved by performing low-frequency dithering on the data bias voltages $V_{bias1}$ and $V_{bias2}$, synchronously detecting the dither frequency component of the output optical power of the DQPSK modulator, and feeding back the result to the data bias voltages $V_{bias1}$ and $V_{bias2}$.

Letting the dithering frequency be $\omega_d$, and the dither amplitude be $A_d$, the aforementioned $\Phi_1$ and $\Phi_2$ are replaced with $\Phi_1 + A_d \times \sin(\omega_{d1} \cdot t)$ and $\Phi_2 + A_d \times \sin(\omega_{d2} \cdot t)$.

Equation (3) is rewritten as shown in the following Equation (4).

[Equation 4]

$$|E_1 + E_3|^2 = \\ 2 + \cos(2\Phi_1 + 2A_d \times \sin(\omega_{d1} \cdot t)) + \cos(2\Phi_2 + 2A_d \times \sin(\omega_{d2} \cdot t)) + \\ 4 \cdot \cos(\Phi_1 + A_d \times \sin(\omega_{d1} \cdot t)) \cdot \cos(\Phi_2 + A_d \times \sin(\omega_{d2} \cdot t)) \cdot \cos(\theta_3) \quad (4)$$

If the $V_{bias1}$ and $V_{bias2}$ are adjusted so that the $\omega_{d1}$ component and $\omega_{d2}$ component that are included in the modulator output light become 0, $\Phi_1$ and $\Phi_2$ become 0 or $\pi$, and it is possible to attain the object.

In the adjustment of the orthogonal bias voltage $V_{bias3}$, the object is to make the value of $\theta_3$ to be $\pm\pi/2$. In order to achieve this object, a constitution has been proposed that performs low-frequency dithering on the orthogonal bias voltage $V_{bias3}$, synchronously detects the dither low-frequency component of the DQPSK modulator output light power, and feeds back the result to the orthogonal bias voltage $V_{bias3}$. There exists technology that performs bias control by superimposing a dither signal on the bias voltage (for example, refer to Patent Document 1).

As a constitution that similarly performs adjustment of the orthogonal bias voltage $V_{bias3}$, there exists technology that adds low-frequency dithering of different frequencies to both of the data bias voltages $V_{bias1}$ and $V_{bias2}$ to detect the sum frequency component or the differential frequency component from the DQPSK output light power, and by using this performs adjustment of the orthogonal bias voltage $V_{bias3}$.

As a different approach for performing adjustment of $V_{bias3}$, there also exists technology that adds low-frequency dithering of the same frequency but different phases to both of the data bias voltages $V_{bias1}$ and $V_{bias2}$, detects the double-wave component of the dither frequency from the DQPSK output light power, and by using this performs adjustment of the orthogonal bias voltage $V_{bias3}$.

A constitution has also been proposed that, using a high-speed photo detector, detects the change of each bit of the fourth term of Equation (3), and performs detection of the fluctuation of $\theta_3$ and performs adjustment of the orthogonal bias voltage $V_{bias3}$. Specifically, control by the peak detection circuit of the DQPSK modulator output light, or Costas loop are equivalent to this.

PRIOR ART DOCUMENT

Patent Documents

[Patent Document 1] Japanese Patent Publication No. 2642499

SUMMARY OF THE INVENTION

Problem to be Solved by the Invention

However, in order to adjust the $\theta_3$ to $\pi/2$ by automatic control of the orthogonal bias voltage $V_{bias3}$, the difficulties stated below follow.

Focusing on Equation (3), when the data bias voltages $V_{bias1}$ and $V_{bias2}$ are optimal values (or in the vicinity), $\Phi_1$ is equal to (or roughly equal to) 0 or $\pi$, and $\Phi_2$ is equal to (or roughly equal to) 0 or $\pi$. Which value is taken is decided depending on "0", or "1" of the first data signal Data 1, bar (Data 1), and the second data signal Data 2, bar (Data 2). On the other hand, $\theta_3$ appears only in the fourth term. When $\Phi_1$ and $\Phi_2$ are both equal (or roughly equal) to 0 or $\pi$, the following Equation (5) comes into effect (or mostly comes into effect).

[Equation 5]

$$\text{(Fourth Term of Equation (3))} = 4 \times 1 \times 1 \times \cos(\theta_3) \quad (5)$$

On the other hand, when one of $\Phi_1$ and $\Phi_2$ is equal to (or roughly equal to) 0 and the other to (or roughly equal to) $\pi$, as for the fourth term of Equation (3), the following Equation (6) comes into effect (or mostly comes into effect).

[Equation 6]

$$\text{(Fourth Term of Equation (3))} = -4 \times 1 \times 1 \times \cos(\theta_3) \quad (6)$$

Since only the sign differs between Equation (5) and Equation (6), the average value of both is 0, regardless of the values of $\theta_3$, $\omega_{d1}$, and $\omega_{d2}$. For this reason, when the long-time average of Equation (3) is taken, the values when the same sign and the values when different signs cancel each other out, and so the effect of the fourth term becomes extremely small. In an actual modulator, due to the vertical asymmetry of the drive waveform, and the band limitation of the monitor PD (Photo Detector), they are not completely balanced out, but compared to adjustment of other data bias voltages $V_{bias1}$ and $V_{bias2}$, extremely significant difficulties are involved.

Since the peak detection circuit of the modulator output light detects the maximum value for each bit, there is no cancellation between when the same sign and when different signs. However, a wide-band photo detector or electronic circuit capable of following the bit rate is required, and mounting is difficult.

One more issue of orthogonal bias voltage $V_{bias3}$ adjustment is that when $\theta_3$ diverges from the optimal value $\pi/2$, it is difficult to determine whether the direction of divergence is positive or negative. FIGS. 12A to 12C are diagrams that show eye patterns of the DQPSK optical modulator output that is obtained by a simulation program. The data bias voltages $V_{bias1}$ and $V_{bias2}$ are assumed to have been already adjusted to ideal values. In FIGS. 12A to 12C, the horizontal axis denotes time, with the optical waveform of 5 bit portions shown.

FIG. 12A shows the optical waveform in the state of $\theta_3 = 0.5\pi$, that is, the ideal operation state. The trace is divided into three, which corresponds to the case of the same sign continuing between adjacent bits, the case of either one of the first data signal Data 1, bar (Data 1) or the second data signal Data 2, bar (Data 2) changing to a different sign, and the case of both of the first data signal Data 1, bar (Data 1) and the second data signal Data 2, bar (Data 2) changing to different signs.

FIG. 12B shows the light waveform in the case of $\theta_3=0.4\pi$. FIG. 12C shows the light waveform in the case of $\theta_3=0.6\pi$. In either case, the three traces of the light waveforms are further divided into two, by the signs of the first data signal and the second data signal being the same sign or different signs. However, there is absolutely no distinction between the light waveform shown in FIG. 12B and the light waveform shown in FIG. 12C due to the symmetry of trigonometric functions. In other words, it is extremely difficult to judge from the light waveform whether causing $\theta_3$ to increase brings it closer to the optimal value, or causing it to decrease brings it closer to the optimal value.

Since control by a Costas loop performs a sign comparison operation for each bit, it is possible to judge the positive/negative of a phase error of $\theta_3$. However, a wide-band photo detector capable of following the bit rate, or an electronic circuit (in particular, a mixer) is required, and mounting is difficult.

In this way, in the control of the bias voltage of an MZI-type optical modulator, the method that superimposes a dither signal on the main signal has existed as the conventional technology. In this conventional technology, the DQPSK optical modulator is a modulator that integrates the MZI-type optical modulator, and there is a need to control the bias voltage at three locations. In particular, there has been the issue of the optical phase shifter that adjusts the phase of signals from two light paths having a poor detection accuracy with respect to the dither signal for bias voltage control. Also, for that reason, there has been the problem of not being able to control the phase modulation with high accuracy.

The present invention have been conceived in view of these circumstances. An object of the present invention is to provide an optical signal transmitter that can control the phase modulation with high accuracy, and a bias voltage control method therefor.

Problem to be Solved by the Invention

In order to solve the aforementioned issues, an optical signal transmitter according to a first aspect of the present invention includes: two phase modulating portions; a phase shifter which displaces carrier phases of two output lights from the phase modulating portions by $\pi/2$; a multiplexing portion which multiplexes two signal lights, carrier phases of the two signal lights being made orthogonal to each other by the phase shifter; a drive signal electrode portion which supplies a differential data signal to each of four paths of interference optical waveguides, each of the two phase modulating portions having the interference optical waveguides, the differential data signal having an amplitude which is equal to a half-wave voltage $V\pi$ of the two phase modulating portions; a drive amplifier which amplifies the differential data signal to be supplied to each of the four paths of the interference optical waveguides; a data bias electrode portion which supplies a total of four data bias voltages to two arms, each of the two phase modulating portions having the two arms; an orthogonal bias electrode portion which supplies an orthogonal bias voltage to the phase shifter; a data bias power supply portion that adjusts delay times in the two phase modulating portions by applying the data bias voltages to the data bias electrode portion; an orthogonal bias power supply portion that adjusts a delay amount relative to a light output from at least one of the two phase modulating portions by applying the orthogonal bias voltage to the orthogonal bias electrode portion; a dither signal adding portion that adds a dither signal to at most three of the four data bias voltages; a dither detecting portion which detects a wave that is n-times a dither component from an output of the multiplexing portion (where n is an integer equal to or greater than one); and an orthogonal bias control portion which feeds back a detection result of the dither detecting portion to the orthogonal bias power supply portion, and the orthogonal bias power supply portion adjusts the delay amount relative to the light output from at least one of the two phase modulating portions by controlling the orthogonal bias voltage to be applied to the orthogonal bias electrode portion based on feedback from the orthogonal bias control portion.

Also, in order to solve the aforementioned issues, an optical signal transmitter according to a second aspect of the present invention includes: two phase modulating portions; a phase shifter which displaces carrier phases of two output lights from the phase modulating portions by $\pi/2$; a multiplexing portion which multiplexes two signal lights, carrier phases of the two signal lights being made orthogonal to each other by the phase shifter; a drive signal electrode portion which supplies a differential data signal to each of four paths of interference optical waveguides, each of the two phase modulating portions having the interference optical waveguides, the differential data signal having an amplitude which is smaller than a half-wave voltage $V\pi$ of the two phase modulating portions; a drive amplifier which amplifies the differential data signal to be supplied to each of the four paths of the interference optical waveguides; a data bias electrode portion which supplies a total of four data bias voltages to two arms, each of the two phase modulating portions having the two arms; an orthogonal bias electrode portion which supplies an orthogonal bias voltage to the phase shifter; a data bias power supply portion that adjusts delay times in the two phase modulating portions by applying the data bias voltages to the data bias electrode portion; an orthogonal bias power supply portion that adjusts a delay amount relative to a light output from at least one of the two phase modulating portions by applying the orthogonal bias voltage to the orthogonal bias electrode portion; a dither signal adding portion that adds a dither signal to at least one of the four data bias voltages; a dither detecting portion which detects a wave that is n-times a dither component from an output of the multiplexing portion (where n is an integer equal to or greater than one); and an orthogonal bias control portion which feeds back a detection result of the dither detecting portion to the orthogonal bias power supply portion, and the orthogonal bias power supply portion adjusts the delay amount relative to the light output from at least one of the two phase modulating portions by controlling the orthogonal bias voltage to be applied to the orthogonal bias electrode portion based on feedback from the orthogonal bias control portion.

In the optical signal transmitter according to the first or second aspect of the present invention, when there are two dither signals and the two dither signals are used in the two phase modulating portions respectively, a relative phase difference of the two dither signals may be 90 degrees.

In the optical signal transmitter according to the first or second aspect of the present invention, the dither detecting portion may detect an envelope of an output signal light of the multiplexing portion.

In the optical signal transmitter according to the first or second aspect of the present invention, a bandwidth of the two phase modulating portions, or a bandwidth of the drive amplifier, may be an operating speed of half of a symbol rate.

In the optical signal transmitter according to the first or second aspect of the present invention, when there are two or more dither signals, the dither signal adding portion may enable a relative phase difference of the dither signals to be changed.

Moreover, in order to solve the aforementioned issues, a bias voltage control method according to a third aspect of the present invention is for an optical signal transmitter including two phase modulating portions, a phase shifter which displaces carrier phases of two output lights from the phase modulating portions by π/2, and a multiplexing portion which multiplexes two signal lights, carrier phases of two signal lights being made orthogonal to each other by the phase shifter. The bias voltage control method includes the steps of: supplying a differential data signal to each of four paths of interference optical waveguides by a drive signal electrode portion, each of the two phase modulating portion having the interference optical waveguides, the differential data signal having an amplitude which is equal to a half-wave voltage Vπ of the two phase modulating portions; supplying a total of four data bias to two arms by a data bias electrode portion, each of the two phase modulating portions having the two arms; supplying an orthogonal bias voltage to the phase shifter by an orthogonal bias electrode portion; adjusting delay times in two phase modulating portions by applying the data bias voltages to the data bias electrode portion, by a data bias power supply portion; adjusting a delay amount relative to a light output from at least one of the two phase modulating portions by applying the orthogonal bias voltage to the orthogonal bias electrode portion, by an orthogonal bias power supply portion; adding a dither signals to at most three of the four data bias voltages by a dither signal adding portion; detecting a wave that is n-times a dither component from an output of the multiplexing portion by a dither detecting portion (where n is an integer equal to or greater than one); feeding back a detection result of the dither detecting portion to the orthogonal bias power supply portion by an orthogonal bias control portion; and adjusting the delay amount relative to the light output from at least one of the two phase modulating portions by controlling the orthogonal bias voltage to be applied to the orthogonal bias electrode portion based on feedback from the orthogonal bias control portion, by the orthogonal bias power supply portion.

Also, in order to solve the aforementioned issues, a bias voltage control method according to a fourth aspect of the present invention is for an optical signal transmitter including two phase modulating portions, a phase shifter which displaces carrier phases of two output lights from the phase modulating portions by π/2, and a multiplexing portion which multiplexes two signal lights, carrier phases of two signal lights being made orthogonal to each other by the phase shifter. The bias voltage control method includes the steps of: supplying a differential data signal to each of four paths of interference optical waveguides by a drive signal electrode portion, each of the two phase modulating portion having the interference optical waveguides, the differential data signal having an amplitude which is smaller than a half-wave voltage Vπ of the two phase modulating portions; supplying a total of four data bias to two arms by a data bias electrode portion, each of the two phase modulating portions having the two arms; supplying an orthogonal bias voltage to the phase shifter by an orthogonal bias electrode portion; adjusting delay times in two phase modulating portions by applying the data bias voltages to the data bias electrode portion, by a data bias power supply portion; adjusting a delay amount relative to a light output from at least one of the two phase modulating portions by applying the orthogonal bias voltage to the orthogonal bias electrode portion, by an orthogonal bias power supply portion; adding a dither signal to at least one of the four data bias voltages by a dither signal adding portion, the dither signal being asymmetric and having a different amplitude; detecting a wave that is n-times a dither component from an output of the multiplexing portion by a dither detecting portion (where n is an integer equal to or greater than one); feeding back a detection result of the dither detecting portion to the orthogonal bias power supply portion by an orthogonal bias control portion; and adjusting the delay amount relative to the light output from at least one of the two phase modulating portions by controlling the orthogonal bias voltage to be applied to the orthogonal bias electrode portion based on feedback from the orthogonal bias control portion, by the orthogonal bias power supply portion.

Effect of the Invention

According to this invention, by imparting asymmetric dither signals to the data bias voltages of the two phase modulating portions, it is evident from the optical waveform in which direction the bias voltage of the optical phase shifter has shifted in the case of having shifted from the optimal value. For that reason, it is possible to perform with high accuracy bias control of the optical phase modulator by dithering. Thereby, it is possible to perform phase modulation with high accuracy.

EMBODIMENTS FOR CARRYING OUT THE INVENTION

Hereinbelow, one embodiment of the present invention shall be described with reference to the drawings.

Figure 10:
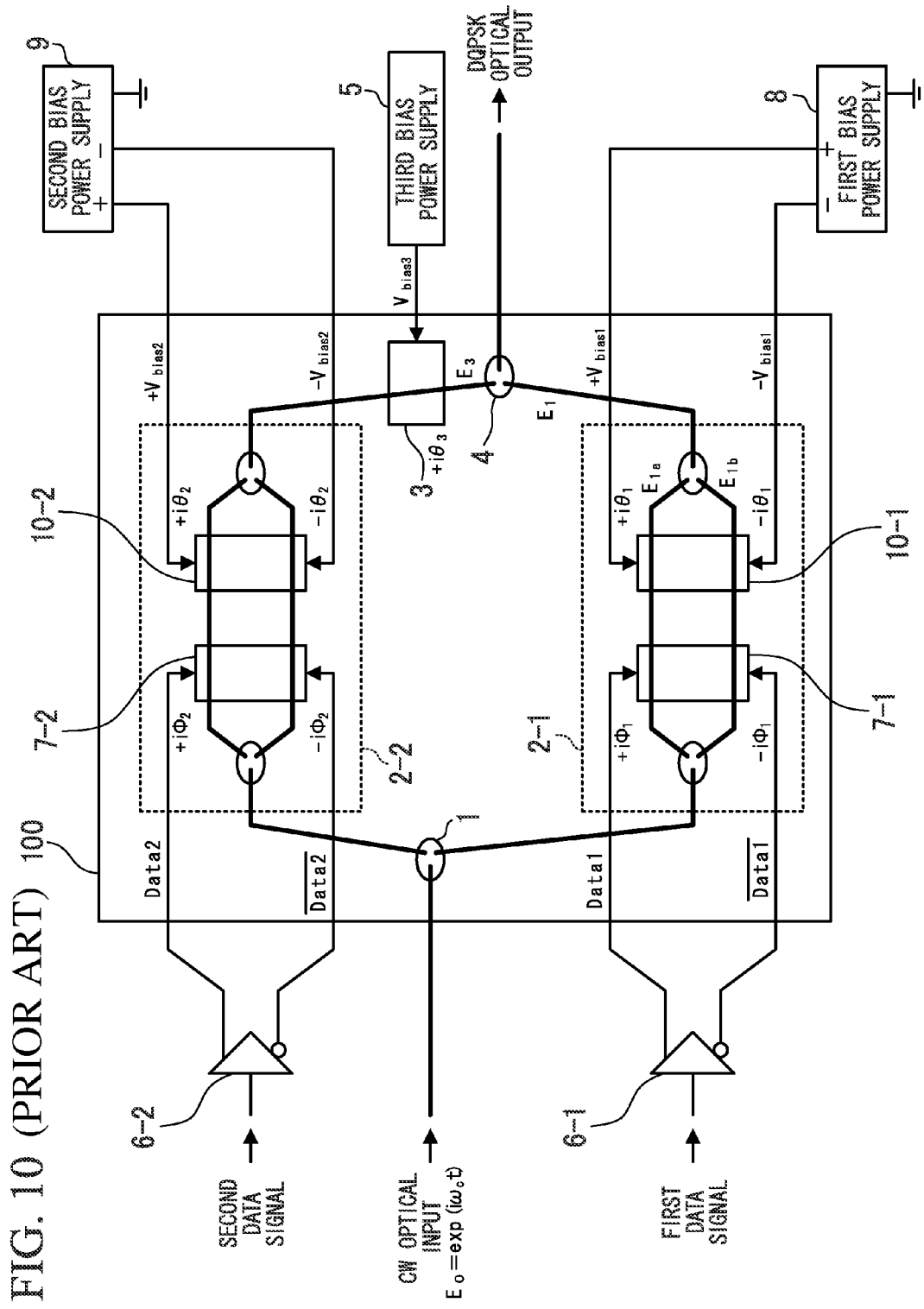
FIG. 10 is a block diagram that shows a typical configuration example of a DQPSK modulator for producing a DQPSK signal, according to the conventional art.
Figure 12A:
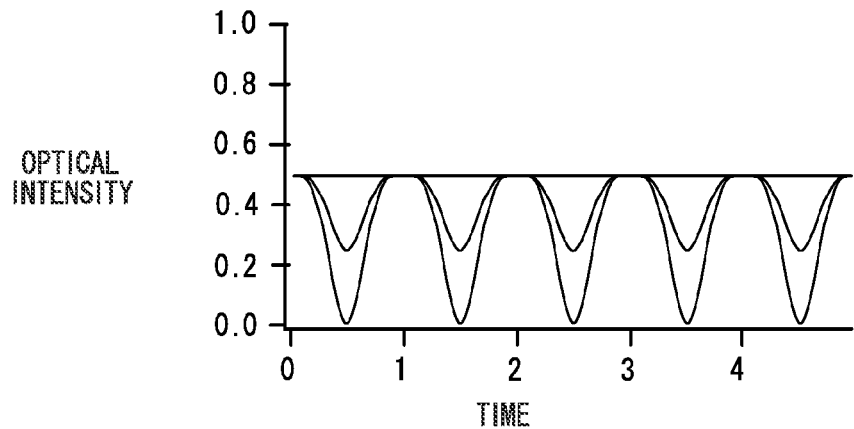
FIG. 12A is a diagram that shows the eye pattern of the DQPSK optical modulator output that is obtained by a simulation program, according to the conventional art.
Figure 12B:
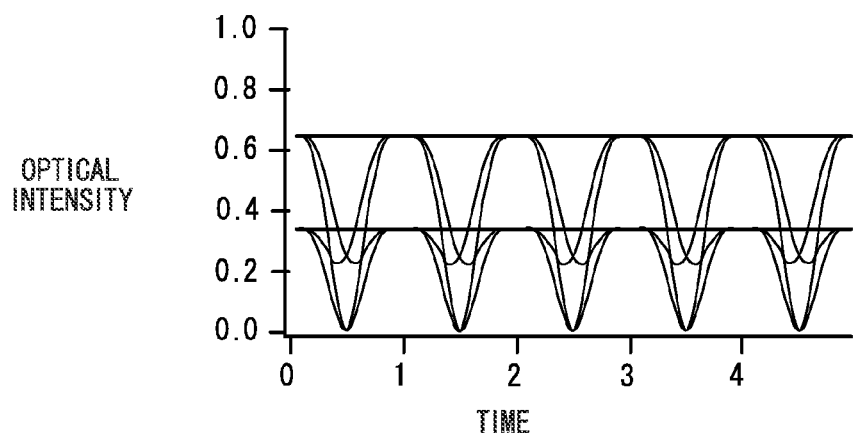
FIG. 12B is a diagram that shows the eye pattern of the DQPSK optical modulator output that is obtained by a simulation program, according to the conventional art.
Figure 12C:
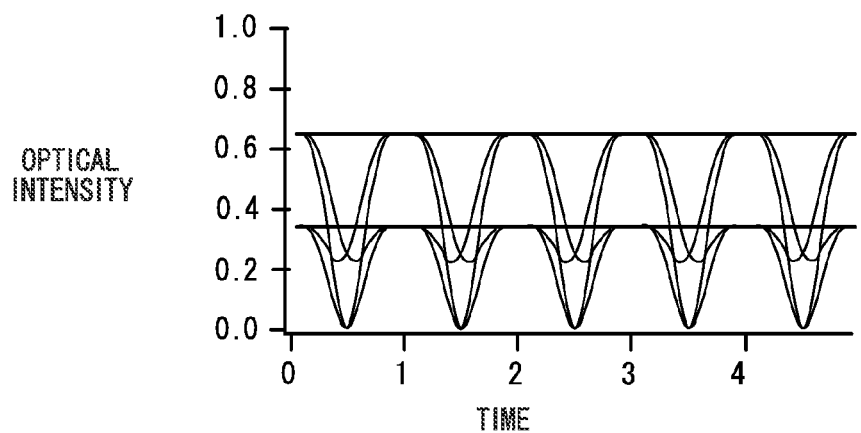
FIG. 12C is a diagram that shows the eye pattern of the DQPSK optical modulator output that is obtained by a simulation program, according to the conventional art.

In the aforementioned conventional technology, an ideal DQPSK optical modulator with unlimited bandwidth was described with Equation (3) or Equation (4), and FIGS. 12A to 12C. Here, in order to describe the operation of a more realistic DQPSK optical transmitter, the output waveform of a 43 Gb/s optical DQPSK modulator that is obtained by experiments is described. The constitution of the optical modulator and optical modulator drive circuit is the same as FIG. 10. The baud rate was 21.5 Gbit/s.

Figure 1:
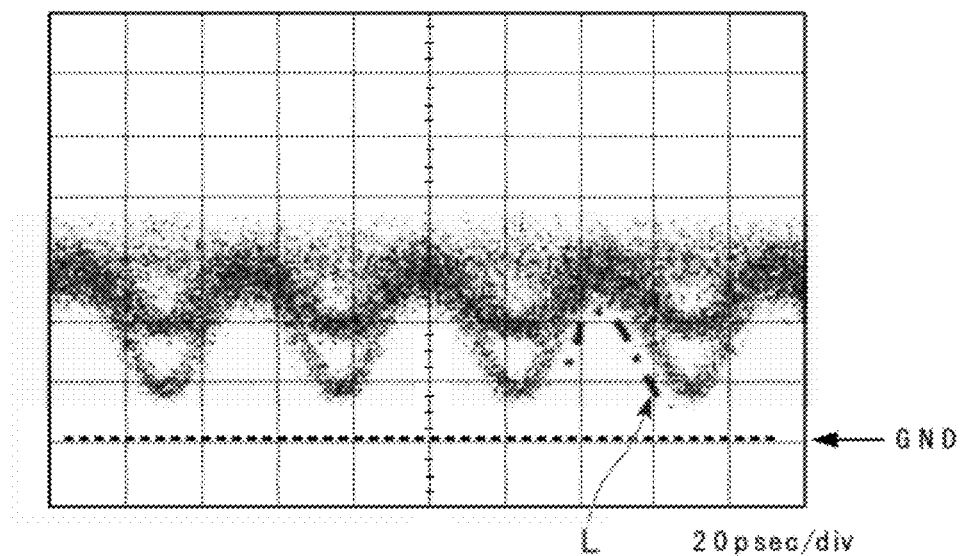
FIG. 1 shows optical waveforms that are measured in the case of $V_{bias1}$, $V_{bias2}$, and $V_{bias3}$ all being adjusted to ideal values.

FIG. 1 shows the optical waveforms that are actually measured, in the case of having adjusted all of the bias voltages $V_{bias1}$, $V_{bias2}$, and $V_{bias3}$ to ideal values. These are the optical waveforms that correspond to FIG. 12A. In FIG. 12A, the notch has fallen to the GND level. In contrast, in FIG. 1, the notch does not reach the GND level (dotted line: reference symbol GND), and traces a sign wave of about 21.5 GHz (dashed dotted line: reference symbol L). This is because it is not possible to form a notch with a sharp fall due to bandwidth limitations of the drive amplifier of the optical modulator. As described above, in the fourth term of Equation (3), the first data signal and the second data signal cancel out due to being different signs or the same sign, but the symmetry breaks down due to the aforementioned bandwidth limitation, and so the fourth term does not completely disappear. The embodiments of the present invention shall be described based on the aforementioned circumstances.

A. First Embodiment

Figure 2:
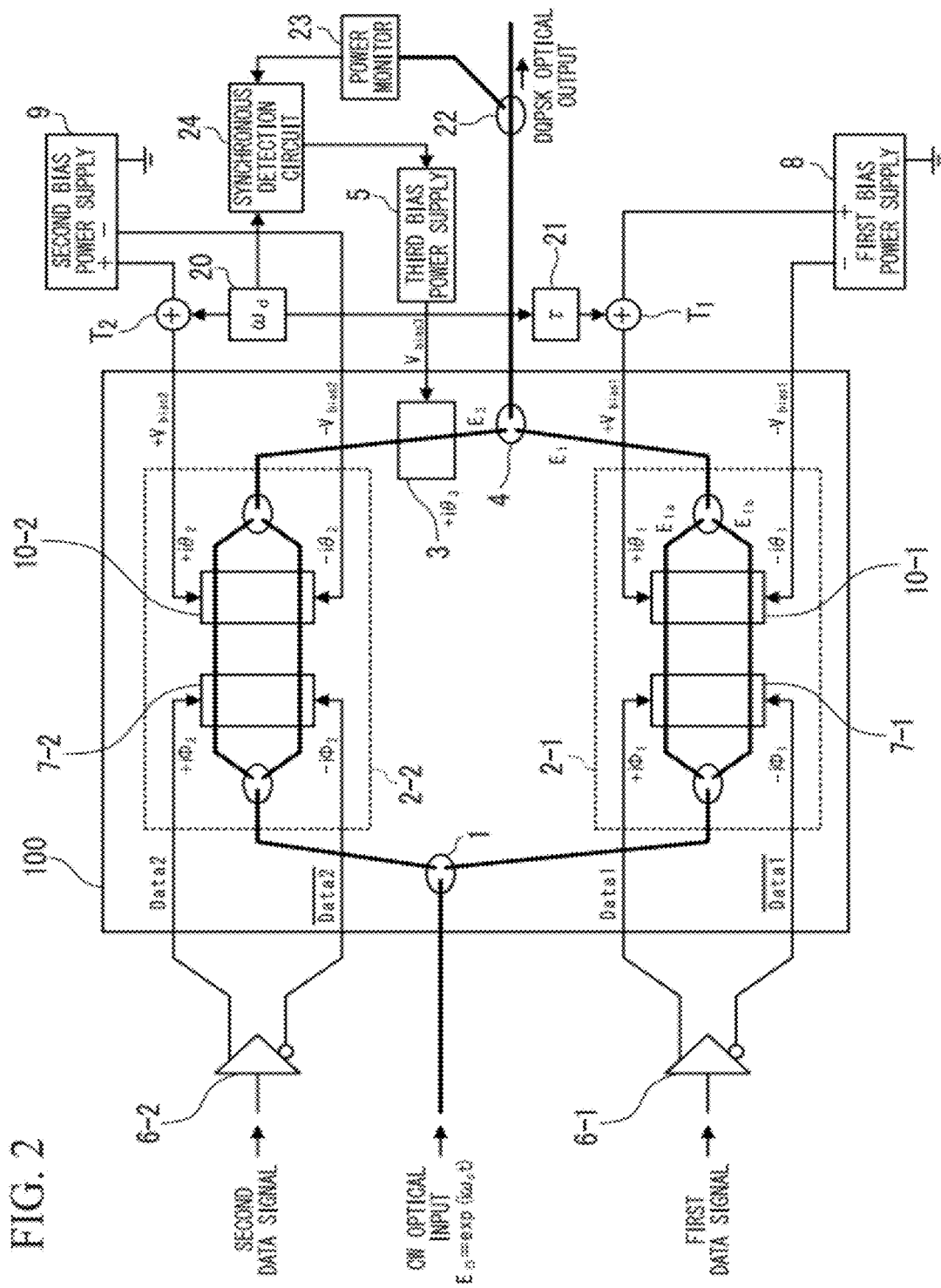
FIG. 2 is a block diagram that shows the constitution of a DQPSK modulator according to a first embodiment of the present invention.

FIG. 2 is a block diagram that shows the constitution of the DQPSK modulator 100 according to a first embodiment of the present invention. In the constitution shown in FIG. 2, the same reference symbols are given to the portions corresponding to FIG. 10. In the constitution shown in FIG. 2, mutually opposing data bias voltage $\pm V_{bias1}$ and data bias voltage $\pm V_{bias2}$ are differentially applied to a first data bias electrode 10-1 and a second data bias electrode 10-2, similarly to the conventional constitution shown in FIG. 10. It is assumed that a first bias power supply 8 and a second bias power supply 9 have already been controlled to appropriate values by technology indicated in the conventional art, and $\Phi_1 \equiv \phi_1 + \theta_1$, $\Phi_2 \equiv \phi_2 + \theta_2$ become values approximate to 0 or $\pi$ in accordance with the sign of the first data signal Data 1, bar (Data1), and the second data signal Data 2, bar (Data 2). That is to say, it is assumed that, depending on the sign of the data signal, either state of Case (1) and Case (5) in FIG. 11 is taken.

In the first embodiment, dithering is added asymmetrically to only one of the respective differential biases (only $+V_{bias1}$ and $+V_{bias2}$). The dither signal is a sine wave with amplitude $A_d$ and frequency $\omega_d$. The dither signal is generated by a transmitter (dither signal adding portion) 20, and is applied to the $+V_{bias1}$ and $+V_{bias2}$ by the first bias $T_1$ and the second bias $T_2$ after giving a phase difference $\phi_d$ by a dither signal delay circuit (dither signal adding portion) 21.

Figure 11:
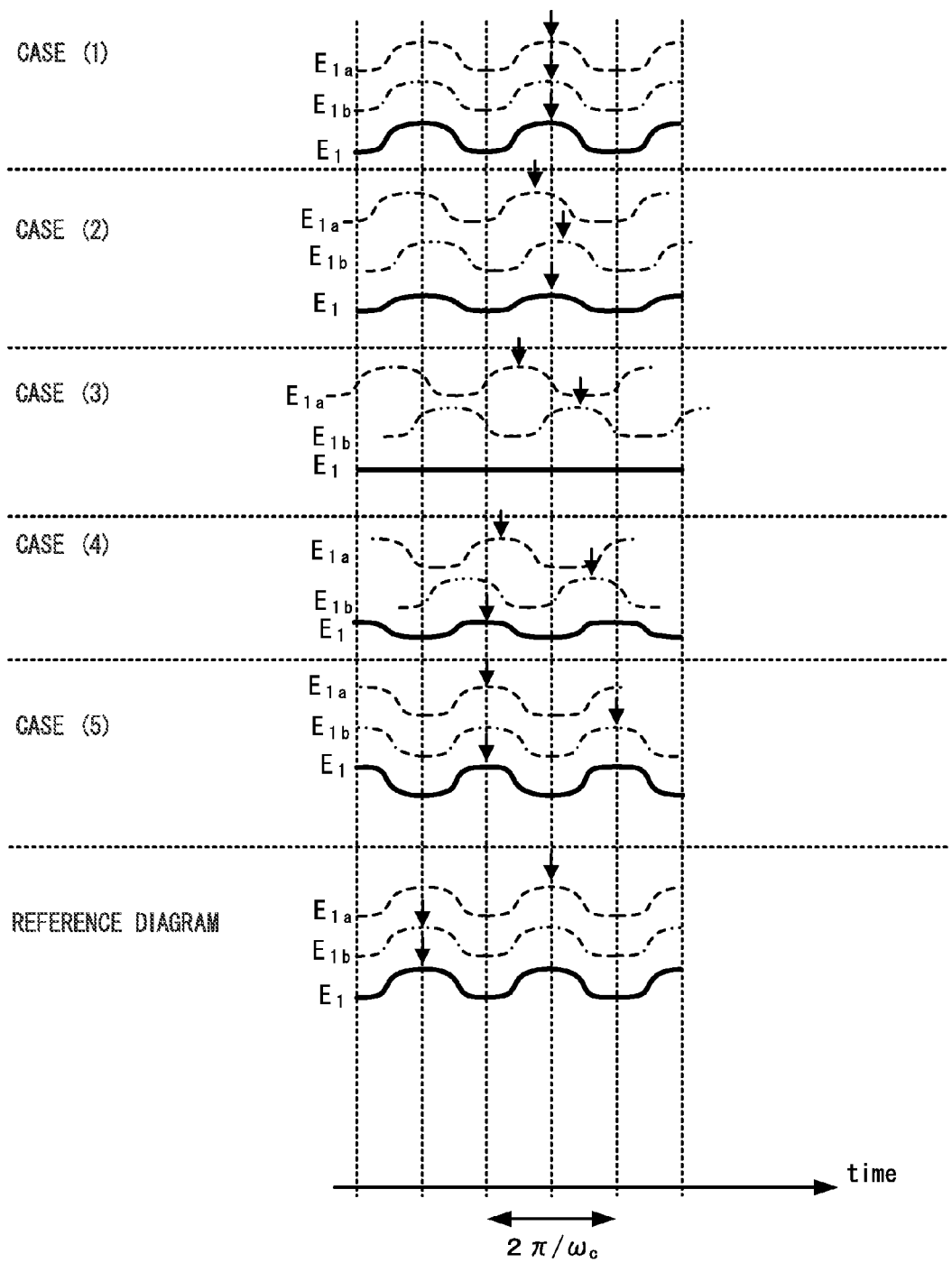
FIG. 11 is a diagram that shows the operation of a first optical phase modulating means by the conventional art.

As shown even in FIG. 11, the delay of the arms of the first and second optical phase modulating portions 2-1 and 2-2 basically must be positive-negative symmetrical. When asymmetry arises in the delay of this arm, the signal quality of the phase modulating light deteriorates. For this reason, the amplitude of the dithering must be made sufficiently small to an extent that does not cause deterioration of the output waveform. Also, the frequency $\omega_d$ is set to be sufficiently smaller than data modulation speed (typical value being several tens of GHz), and is at most several kHz. In this way, as a result of adding a bias asymmetrically, Equation (4) is deformed as the following Equation (7).

[Equation 7]

$$|E_1 + E_3|^2 = 2 + \cos(2\Phi_1 + \Delta\Phi_1) + \cos(2\Phi_2 + A_d \times \Delta\Phi_2) + \cos(\Phi_1 + \Delta\Phi_1/2) \cdot \cos(\Phi_2 + \Delta\Phi_2/2) \cdot \cos(\Delta\Phi_1/2 - \Delta\Phi_2/2 - \theta_3)$$

Where, $\Delta\Phi_1 = A_d \times \sin(\omega_d \cdot t + \phi_d)$, $\Delta\Phi_2 = A_d \times \sin(\omega_d \cdot t)$ (7)

Note that proportionality coefficients that are not essential are ignored.

Figure 3:
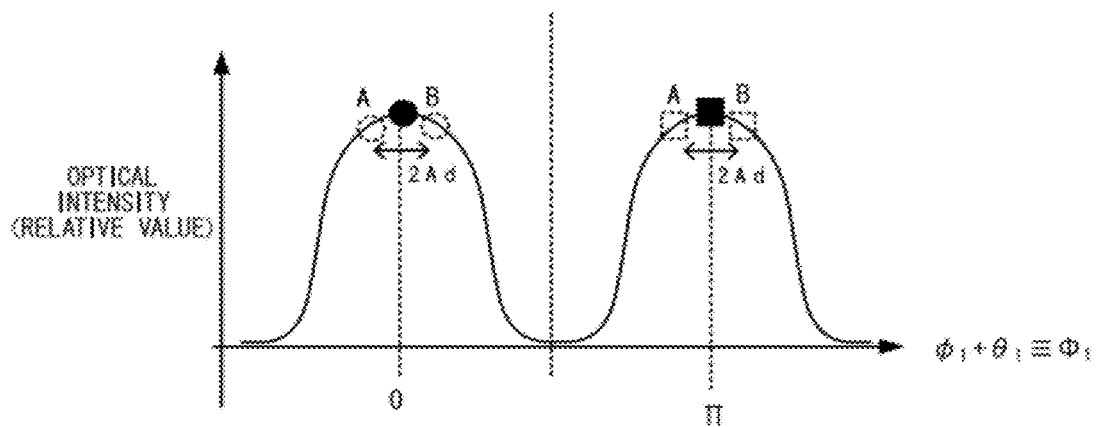
FIG. 3 is a schematic diagram that shows schematically the output light intensity of a first phase modulating portion as a function of the phase difference that is given to each arm, in the first embodiment of the present invention.

Regarding the phase difference $\phi_d$ of the two dither signals, $\pi/2$ is preferred. The reason for this shall be described with reference to FIG. 3. FIG. 3 is a schematic diagram that shows schematically the output light intensity of the first optical phase modulating portion 2-1 in FIG. 11 as a function of the phase difference that is given to each arm. As described in FIG. 11, in the two operating points that correspond to the two signs, $\phi_1 + \theta_1 \equiv \Phi_1 = 0$ (black circle) and $\Phi_1 = \pi$ (black square). At these two operating points, the optical intensity becomes a maximum value. In FIG. 3, when $\Phi_1 = 0$, the optical phase=0, and when the $\Phi_1 = \pi$, the optical phase=$\pi$. When dithering $\Delta\Phi_1$ is performed, the operating point oscillates with a frequency $\omega_d$ and an amplitude $2A_d$ (the circles A, B of the dashed line, and the squares A, B of the dashed line). As a result, intensity modulation of frequency $2\omega_d$ occurs.

Figure 4:
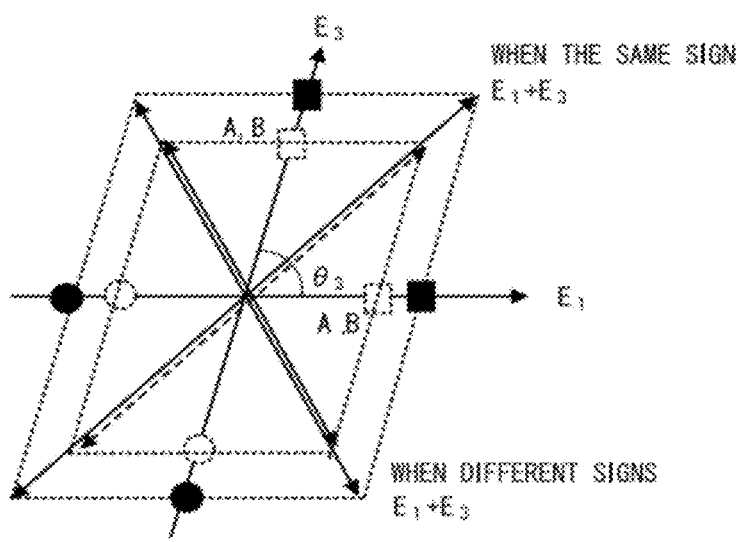
FIG. 4 is a schematic drawing that shows a constellation map in the first embodiment.

This intensity modulation is similarly produced in the second optical phase modulating portion 2-2. FIG. 4 is a schematic diagram that shows a constellation map in the first embodiment. The black and white symbols A, B mean the same states as aforementioned ones. Since the intensity change due to the transition from the black symbol to the while symbol A, B is not related to the value of $\theta_3$, it becomes noise during the $\theta_3$ error detection.

To inhibit the above noise, the delay of the dither signal adding circuit 21 shown in FIG. 2 is required to be adjusted so that $\phi_d = \pi/2$. At this time, the above double wave that is superimposed on the output of the first optical phase modulating portion 2-1 and the above double wave that is superimposed on second optical phase modulating portion 2-2 cancel out, and the accuracy of $\theta_3$ error detection increases. The frequency of the dither signal $\omega_d$ (kHz order) is overwhelmingly smaller compared to the carrier frequency of light $\omega_c$ (100 THz order), so fine adjustment of the dither signal delay circuit 21 is required to be performed only during circuit design.

Figure 5A:
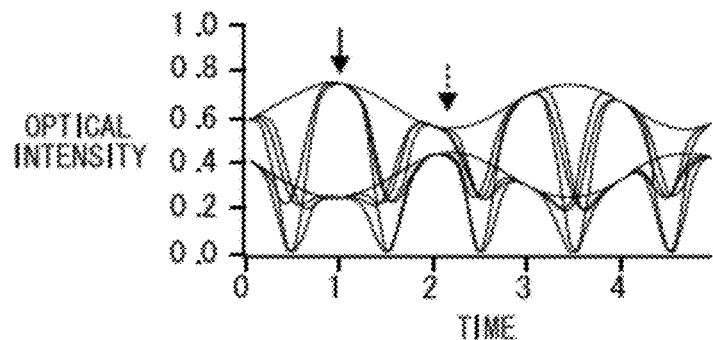
FIG. 5A is a diagram that shows the calculation result of the output optical waveform, of the DQPSK optical modulator that is produced in the first embodiment.
Figure 5B:
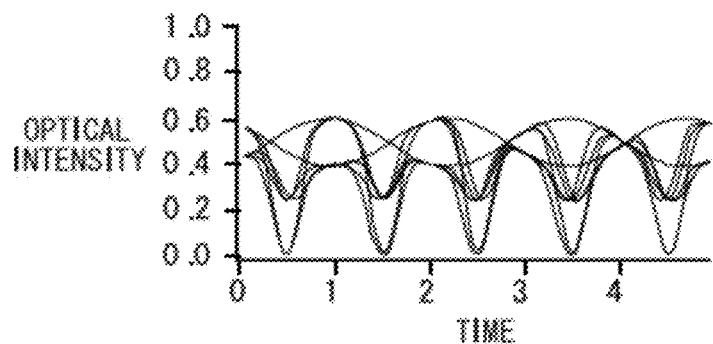
FIG. 5B is a diagram that shows the calculation result of the output optical waveform, of the DQPSK optical modulator that is produced in the first embodiment.
Figure 5C:
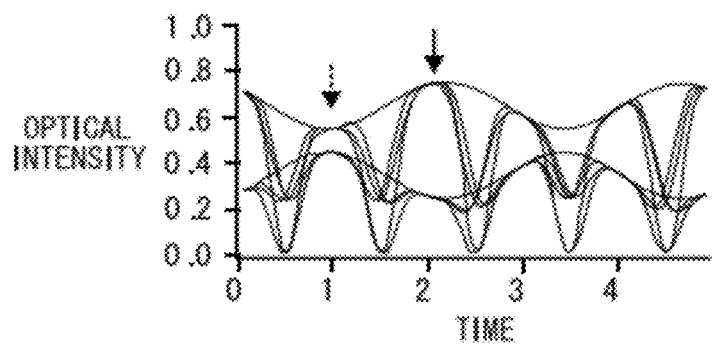
FIG. 5C is a diagram that shows the calculation result of the output optical waveform, of the DQPSK optical modulator that is produced in the first embodiment.

FIGS. 5A to 5F are diagrams that show the calculation result of the output optical waveform, of the DQPSK optical modulator that is produced in the first embodiment. In the same manner as FIGS. 12A to 12C, the eye patterns of 5-bit portions are shown. Normally, the dither frequency $\omega_d$ is overwhelmingly slower than the symbol rate of the data symbol (typical value being several tens of GHz), and should be at least in the kHz order. However, here, in order to illustrate this in an understandable way, the ratio of the dither frequency and symbol rate is calculated as 2:5. In FIGS. 5A to 5C, asymmetric dithering is performed. The $A_d$ in Equation (7) is made a value on the large side in order to clarify the result, and so made to be 0.3. $\phi_d$ is made to be $\pi/2$ for the above reason. FIGS. 5A, 5B, and 5C show the state of $\theta_3=0.4\pi$, $\theta_3=0.5\pi$, and $\theta_3=0.6\pi$. Focusing on the envelope curve, a mountain (solid line arrow) and a valley (dashed line arrow) occur at half of the dithering cycle, and at $\theta_3=0.4\pi$, and $0.6\pi$, the positional relation of the mountain and valley are inverted.

Figure 5D:
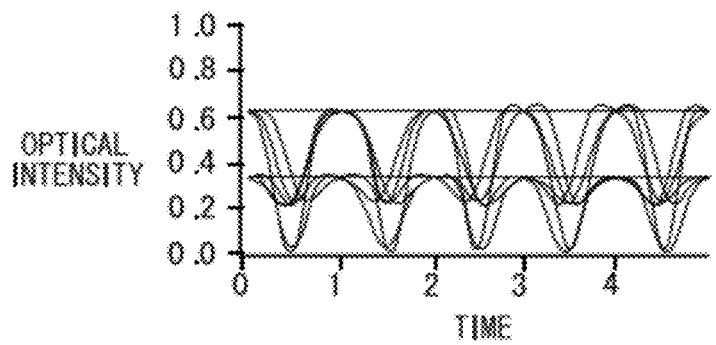
FIG. 5D is a diagram that shows the calculation result of the output optical waveform, of the DQPSK optical modulator that is produced in the first embodiment.
Figure 5E:
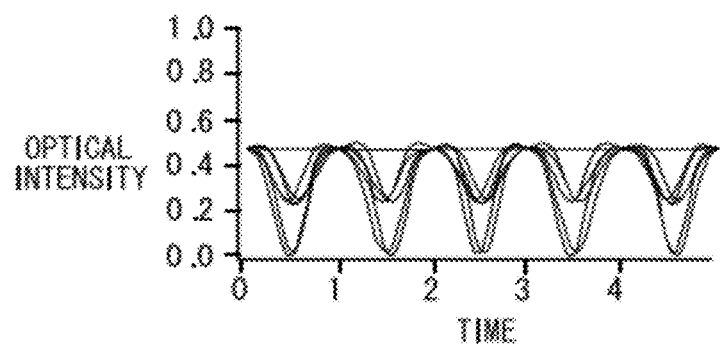
FIG. 5E is a diagram that shows the calculation result of the output optical waveform, of the DQPSK optical modulator that is produced in the first embodiment.
Figure 5F:
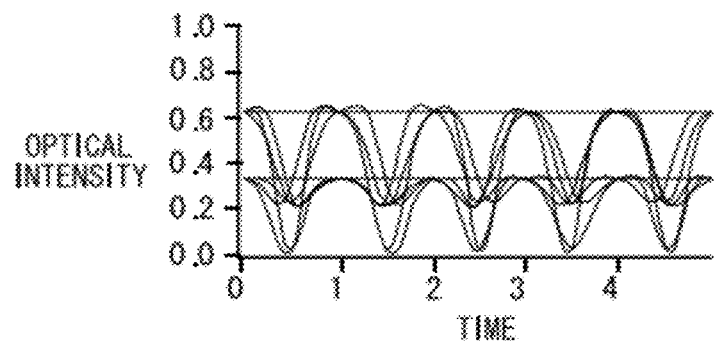
FIG. 5F is a diagram that shows the calculation result of the output optical waveform, of the DQPSK optical modulator that is produced in the first embodiment.

For comparative reference, FIGS. 5D, 5E and 5F are shown which are examples (reference diagrams) in which the value of $A_d$ is the same ($A_d=0.3$), and the dither signal are applied symmetrically. FIGS. 5D, 5E and 5F show the state of $\theta_3=0.4\pi$, $\theta_3=0.5\pi$, and $\theta_3=0.6\pi$ in this order. Here, the output of the transmitter 20 shown in FIG. 2 is not only applied to the data bias voltage $+V_{bias1}$ and the data bias voltage $+V_{bias2}$ but also the data bias voltage $-V_{bias1}$ and the data bias voltage $-V_{bias2}$, and the dither signal that is applied to the data bias voltage $V_{bias1}$ and the data bias voltage $-V_{bias1}$ is made to have reversed polarity, similarly to the data signal. In FIGS. 5D, 5E and 5F, the transition component due to the dither signal mostly disappears. This shows it to be effective in improving the sensitivity of the dither signal detection, in the first embodiment.

In the first embodiment, the output light waveform is split by the monitor coupler 22 shown in FIG. 2, and this is received by the power monitor 23. The power monitor (dither detecting portion) 23 monitors the average power or envelope of the optical signal that is tapped. The synchronous detection circuit (dither detecting portion, orthogonal bias control portion) 24 synchronously detects the dither frequency $\omega_d$, or a wave component that is n-times thereof (where n is an integer), and by feeding back the obtained result to the third bias power supply 5, it is possible to lock the $\theta_3$ to the appropriate value $0.57\pi$. n is preferably 1 or 2, but in consideration of the constitution of the bias adding electrode in the DQPSK optical modulator 100 and the polarity of the synchronous detection result, a value that enables formation of a control circuit with the best accuracy may be chosen.

Here, among the four data bias voltages for phase modulation ($\pm V_{bias1}$ and $\pm V_{bias2}$), dithering is applied to only two, but it is not limited thereto. A constitution is also possible that adds dithering to only one among these four, or as many as three. Alternatively, a constitution is possible in which the amplitude differs for only one among the four data bias voltages for phase modulation.

B. Second Embodiment

Next, a second embodiment of the present invention shall be described.

Figure 6:
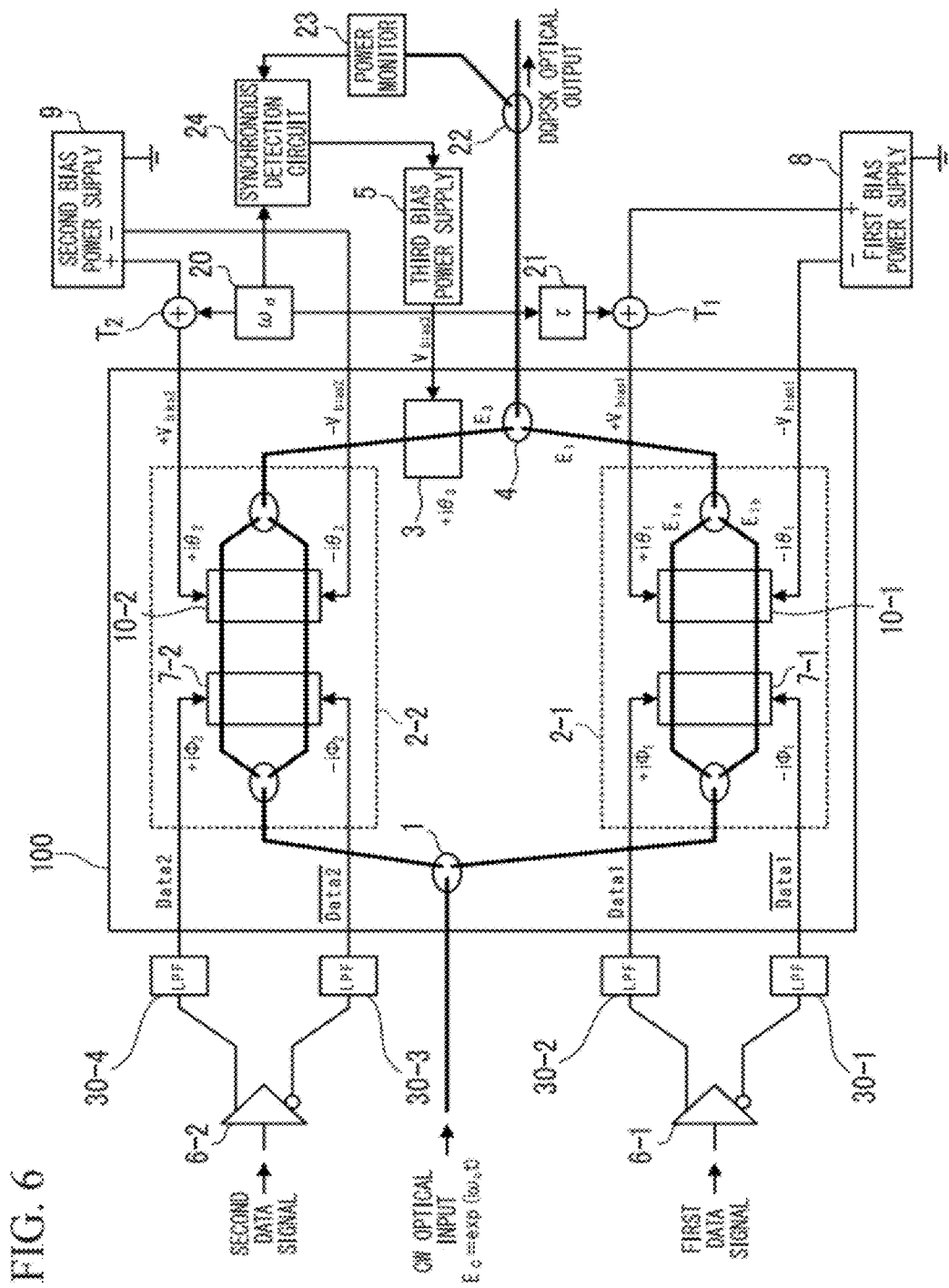
FIG. 6 is a block diagram that shows the constitution of a DQPSK modulator according to a second embodiment of the present invention.

FIG. 6 is a block diagram that shows the constitution of the DQPSK modulator 100 according to the second embodiment of the present invention. Note that in the constitution shown in FIG. 6, the same reference symbols are given to the portions corresponding to FIG. 2. The point of difference between the second embodiment and the aforementioned first embodiment is a first to fourth LPF (Low Pass Filter) 30-1, 30-2, 30-3, 30-4 being inserted at the opposing outputs of each of the first drive amplifier 6-1 and the second drive amplifier 6-2. The first to fourth LPF 30-1 to 30-4 mainly allow passage of a signal equal to or less than the frequency of ½ of the symbol rate. As a result, when the first and second data signals Data 1, bar (Data 1), Data 2, bar (Data 2), which drive the first and second optical phase modulating portions 2-1 and 2-2, continuously have opposite signs, the amplitude slightly decreases, and no longer reaches by a minor extent the half-wavelength voltage $V\pi$ of the first and second optical phase modulating portions 2-1, 2-2. That is to say, it is not possible to take the two states of Case (1) and Case (5) of FIG. 11, and $\phi_1+\theta_1$ comes to take the two values of $0+\Delta$, $\pi-\Delta$ ($\Delta$ is a positive number). As shown in FIG. 11, even in this state, it is possible for the optical phase to take the two values of 0 and $\pi$. However, the amplitude decreases somewhat. A constitution that lowers the amplitude by using an attenuator in place of the first to fourth LPFs 30-1 to 30-4 is also possible.

Figure 7:
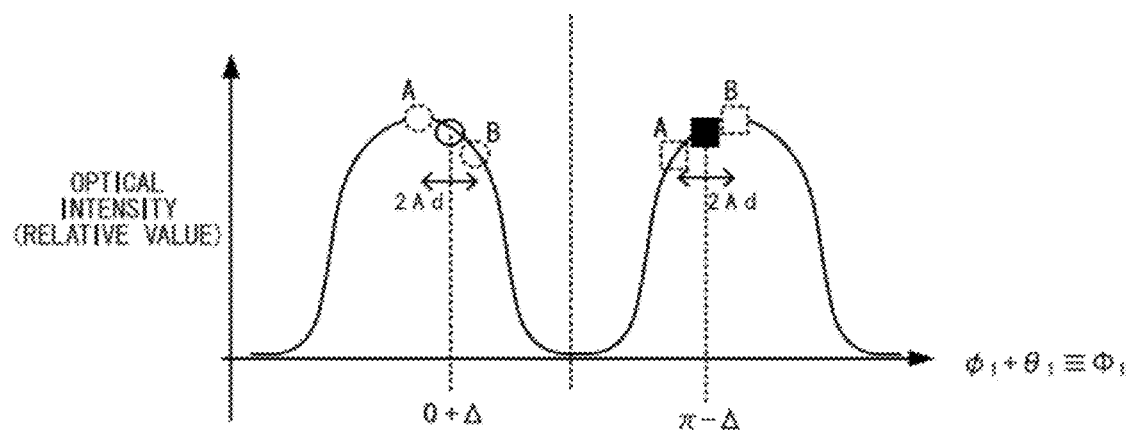
FIG. 7 is a schematic diagram that shows the optical phase modulating portion output in the aforementioned state, according to the second embodiment.

FIG. 7 is a schematic diagram that shows the optical phase modulating portion output in the aforementioned state, according to the second embodiment. In FIG. 7, when $\phi_1=0$, the optical phase=0, and when the $\phi_1=\pi$, the optical phase=$\pi$. In the constitution shown in FIG. 3 that corresponds to the first embodiment described above, the two operating points (black symbols) are peaks of light intensity, but in the second embodiment the two operating points have an output intensity that is somewhat less than the peak of the optical intensity. Here, when dithering of the amplitude $A_d$ and frequency $\omega_d$ is added, the delay and optical intensity shown by the white circles A, B and the white squares A, B are imparted, and optical intensity modulation is produced. However, the optical intensity modulation in the second embodiment differs from that of the first embodiment on the points of: frequency is $\omega_d$; and the relationship of the strength of light is inverted between when the optical phase=0, and when the optical phase is $\pi$.

Figure 8:
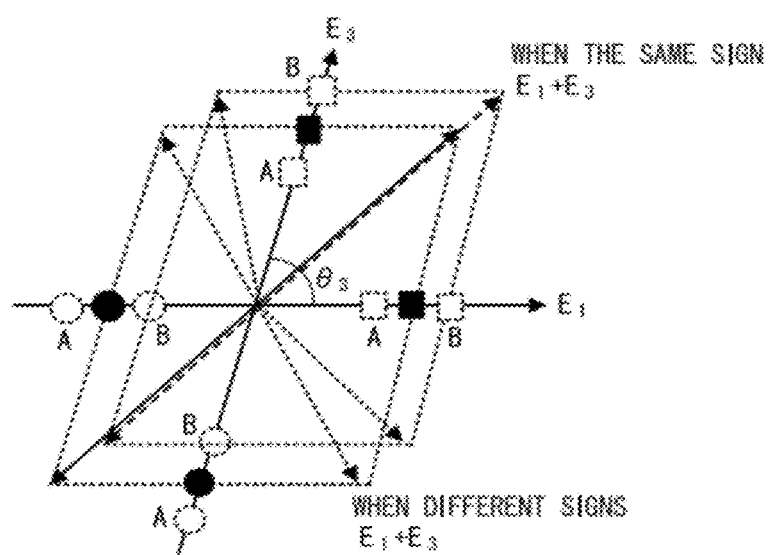
FIG. 8 is a schematic drawing that shows a constellation map in the second embodiment.

This intensity modulation is similarly produced in the second optical phase modulating portion 2-2. FIG. 8 is a schematic diagram that shows a constellation map in the second embodiment. The black and white symbols A, B mean the same states as described previously. That which should be noted here is that at the equilibrium state (black symbol) and when a transition is produced by dithering (white symbols A, B), a distortion occurs in the constellation. As a result, a dither frequency component that is dependent on $\theta_3$ appears in the optical intensity.

This can also be shown by replacing $\Phi_1$ with $0+\Delta$ or it $-\Delta$ in Equation (7).

Since the next Equation (8) is realized, symmetry of the fourth term of Equation (7) is broken between the case where the first data signal Data 1, bar (Data 1) and the second data signal Data 2, bar (Data 2) have the same sign, and the case where they have different signs, and in the long-time average, the dither component that depends on $\theta_3$ appears.

[Equation 8]

$$\cos(\pi-\Delta+\Phi_1+\Delta\Phi_1/2)=-\cos(-\Delta+\Phi_1+\Delta\Phi_1/2)=-\cos(\Delta-\Phi_1-\Delta\Phi_1/2) \quad (18)$$

Figure 9A:
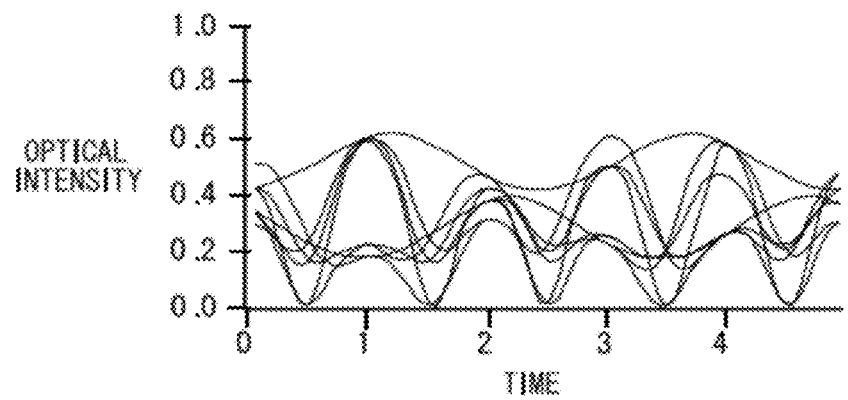
FIG. 9A is a diagram that shows the result of simulation in the second embodiment.
Figure 9B:
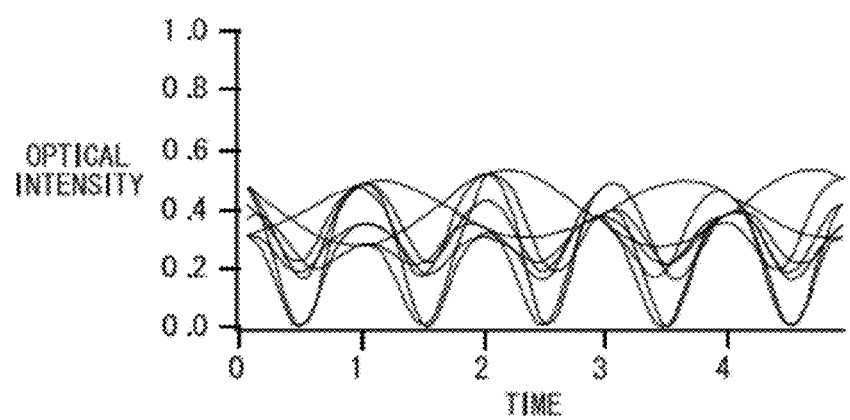
FIG. 9B is a diagram that shows the result of simulation in the second embodiment.
Figure 9C:
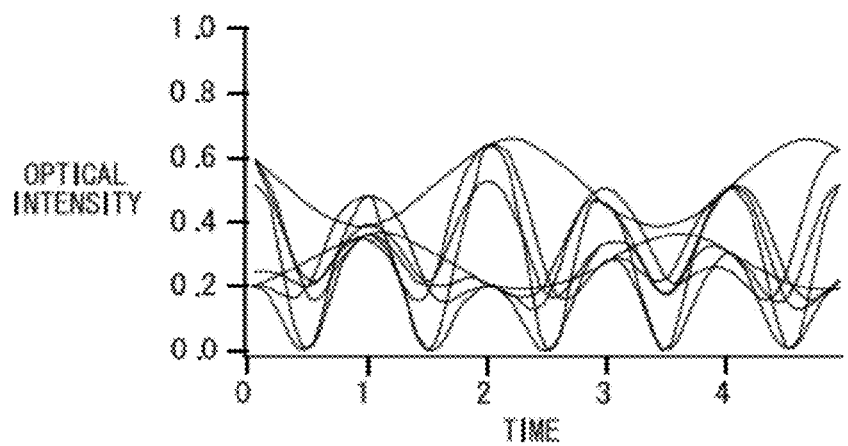
FIG. 9C is a diagram that shows the result of simulation in the second embodiment.

FIGS. 9A to 9C are diagrams that show the result of simulation in the second embodiment. In FIGS. 9A to 9C, $A_d=0.3$, and asymmetric dithering is performed. FIGS. 9A, 9B and 9C show the state of $\theta_3=0.4\pi$, $\theta_3=0.5\pi$, and $\theta_3=0.6\pi$ in this order. In FIGS. 9A to 9C, the drive amplitude is 0.7 V$\pi$. In the constitution shown in FIGS. 9A to 9C, the relationship between the baud rate and the dither frequency is the same as the constitution shown in FIGS. 5A to 5C, but the first data signal Data 1, the second data signal Data 2, and the inverted amplitudes thereof (bar (Data 1), bar (Data 2)) are 70% of the half-wave voltage V$\pi$ of the first and second optical phase modulating portions 2-1, 2-2. In FIGS. 9A to 9C, focusing on the envelope portion, the dither frequency component can clearly be more easily confirmed that in the first embodiment (FIG. 2).

According to the aforementioned first and second embodiments, a dither signal is superimposed asymmetrically on the bias voltage of the two MZI-type DQPSK optical modulators. Thereby, it is evident from the optical waveform which direction the bias voltage of the optical phase shifter 3 has shifted in the case of having shifted from the optimal value, and the effect is obtained of being able to perform bias control with good accuracy. Moreover, since it is possible to perform bias control with good accuracy, the effect is obtained of being able to perform phase modulation with high accuracy.

Here, the dithering is applied to only two among the four bias voltages for phase modulation ($\pm V_{bias1}$ and $\pm V_{bias2}$), but is not limited thereto. A constitution is also possible that adds dithering to only one among these four, or as many as three. Alternatively, a constitution is possible in which the amplitude differs for only one among the four bias voltages for phase modulation. Also, in the case of there being two or more dither signals, the dither signal delay circuit (dither signal adding portion) 21 changes the relative phase difference of the plurality of dither signals.

In the aforementioned first embodiment, it was described that the first bias power supply 8 and the second bias power supply 9 have already been controlled to appropriate values by technology indicated in the conventional art, and $\Phi_1\equiv\phi_1+\theta_1$, $\Phi_2\equiv\phi_2+\theta_2$ become values approximate to 0 or $\pi$ in accordance with the sign of the first data signal Data 1, bar (Data1), and the second data signal Data 2, bar (Data 2).

Also, in the second embodiment, it was described that the first bias power supply 8 and the second bias power supply 9 have already been controlled to appropriate values by technology indicated in the conventional art, and $\Phi_1\equiv\phi_1+\theta_1$, $\Phi_2\equiv\phi_2+\theta_2$ become values approximate to $0+\Delta$ or $\pi-\Delta$ in accordance with the sign of the first data signal Data 1, bar (Data1), and the second data signal Data 2, bar (Data 2). Also, in the first embodiment and the second embodiment, dithering that is added to the first and second optical phase modulating portions 2-1, 2-2 is made asymmetric, and dithering is added not only to the intensity but also the optical phase.

However, accuracy of adjustment of the data bias voltage ($\pm V_{bias1}$ and $\pm V_{bias2}$) sometimes increases when dithering is added only to the intensity, without adding dithering to the optical phase. This can be realized by adding a differential bias to both two data bias voltages ($\pm V_{bias1}$ or $\pm V_{bias2}$) that are added to the first and second optical phase modulating portions 2-1, 2-2. That is to say, it is achieved by adding the inverted signal of the dither signal that is added to the data bias voltage $+V_{bias1}$ to the data bias voltage $-V_{bias1}$, and adding the inverted signal of the dither signal that is added to the data bias voltage $+V_{bias2}$ to the data bias voltage $-V_{bias2}$.

Also, as shown in FIG. 11, if the delay difference that is added to the first and second optical phase modulating portions 2-1, 2-2 is symmetrical, the optical phase is constant, and thus, by also adding dithering symmetrically, the optical phase is not dithered, and only the intensity is dithered. In this state, after the data bias voltages ($\pm V_{bias1}$ and $\pm V_{bias2}$) have been controlled to the appropriate values, the inverted signal of the dither signal is turned OFF by a widely known switching circuit that is not shown, and after making a configuration equivalent with FIG. 2 or FIG. 6, a configuration may be made that performs control of the orthogonal bias voltage $V_{bias3}$.

INDUSTRIAL APPLICABILITY

The present invention can be applied to an optical signal transmitter. According to this optical signal transmitter, it is possible to perform phase modulation with high accuracy.

REFERENCE SYMBOLS

1 First coupler
2-1 First optical phase modulating portion
2-2 Second optical phase modulating portion
3 Optical phase shifter
4 Second coupler
5 Third bias power supply
6-1 First drive amplifier
6-2 Second drive amplifier
7-1 First drive signal electrode
7-2 Second drive signal electrode
8 First bias power supply
9 Second bias power supply
10-1 First data bias electrode
10-2 Second data bias electrode
20 Transmitter
21 Dither signal delay circuit
23 Power monitor
24 Synchronous detection circuit
30-1~30-4 LPF

The invention claimed is:
1. An optical signal transmitter comprising:
two phase modulating portions including first and second phase modulating portions;
a phase shifter which displaces carrier phases of two output lights from the phase modulating portions by $\pi/2$;
a multiplexing portion which multiplexes two signal lights, carrier phases of the two signal lights being made orthogonal to each other by the phase shifter;
a drive signal electrode portion which supplies a differential data signal to each of four paths of interference optical waveguides, each of the two phase modulating portions having two arms, the four paths being comprised by the two arms of the two phase modulating portions, the differential data signal having an amplitude which is equal to a half-wave voltage V$\pi$ of the two phase modulating portions;
a drive amplifier which amplifies the differential data signal to be supplied to each of the four paths of the interference optical waveguides;
a data bias electrode portion which supplies a total of four data bias voltages to each of the four paths;
an orthogonal bias electrode portion which supplies an orthogonal bias voltage to the phase shifter;
a data bias power supply portion that adjusts delay times in the two phase modulating portions by applying the data bias voltages to the data bias electrode portion;
an orthogonal bias power supply portion that adjusts a delay amount relative to a light output from at least one of the two phase modulating portions by applying the orthogonal bias voltage to the orthogonal bias electrode portion;

a dither signal adding portion that adds two or three dither signals to two or three of the four data bias voltages, the dither signals including first and second dither signals, the dither signal adding portion adding the first dither signal to the first phase modulating portion, the dither signal adding portion adding the second dither signal to the second phase modulating portion, a relative phase difference of the first and second dither signals being 90 degrees, the four paths including two or three paths receiving the two or three of the four data bias voltages to which the two or three dither signals are added, respectively, and one path receiving one of the four data bias voltages, the one of the four data bias voltages being free from a dither signal;

a dither detecting portion which detects a wave that is n-times a dither component from an output of the multiplexing portion (where n is an integer equal to or greater than one); and an orthogonal bias control portion which feeds back a detection result of the dither detecting portion to the orthogonal bias power supply portion, the orthogonal bias power supply portion adjusting the delay amount relative to the light output from at least one of the two phase modulating portions by controlling the orthogonal bias voltage to be applied to the orthogonal bias electrode portion based on feedback from the orthogonal bias control portion.

2. An optical signal transmitter comprising:

two phase modulating portions including first and second phase modulating portions;

a phase shifter which displaces carrier phases of two output lights from the phase modulating portions by $\pi/2$;

a multiplexing portion which multiplexes two signal lights, carrier phases of the two signal lights being made orthogonal to each other by the phase shifter;

a drive signal electrode portion which supplies a differential data signal to each of four paths of interference optical waveguides, each of the two phase modulating portions having two arms, the four paths being comprised by the two arms of the two phase modulating portions, the differential data signal having an amplitude which is smaller than a half-wave voltage $V\pi$ of the two phase modulating portions;

a drive amplifier which amplifies the differential data signal to be supplied to each of the four paths of the interference optical waveguides;

an amplitude control portion which adjusts an output amplitude of the drive amplifier so as to be smaller than the half-wave voltage $V\pi$ of the two phase modulating portions;

a data bias electrode portion which supplies a total of four data bias voltages to each of the four paths;

an orthogonal bias electrode portion which supplies an orthogonal bias voltage to the phase shifter;

a data bias power supply portion that adjusts delay times in the two phase modulating portions by applying the data bias voltages to the data bias electrode portion;

an orthogonal bias power supply portion that adjusts a delay amount relative to a light output from at least one of the two phase modulating portions by applying the orthogonal bias voltage to the orthogonal bias electrode portion;

a dither signal adding portion that adds at least two dither signals to at least two of the four data bias voltages, the dither signals including first and second dither signals, the dither signal adding portion adding the first dither signal to the first phase modulating portion, the dither signal adding portion adding the second dither signal to the second phase modulating portion, a relative phase difference of the first and second dither signals being 90 degrees;

a dither detecting portion which detects a wave that is n-times a dither component from an output of the multiplexing portion (where n is an integer equal to or greater than one); and an orthogonal bias control portion which feeds back a detection result of the dither detecting portion to the orthogonal bias power supply portion, the orthogonal bias power supply portion adjusting the delay amount relative to the light output from at least one of the two phase modulating portions by controlling the orthogonal bias voltage to be applied to the orthogonal bias electrode portion based on feedback from the orthogonal bias control portion.

3. The optical signal transmitter according to claim 1, wherein the dither detecting portion detects an envelope of an output signal light of the multiplexing portion.

4. The optical signal transmitter according to claim 1, wherein a bandwidth of the two phase modulating portions, or a bandwidth of the drive amplifier, is an operating speed of half of a symbol rate.

5. A bias voltage control method for an optical signal transmitter comprising two phase modulating portions including first and second phase modulating portions, a phase shifter which displaces carrier phases of two output lights from the phase modulating portions by $\pi/2$, and a multiplexing portion which multiplexes two signal lights, carrier phases of two signal lights being made orthogonal to each other by the phase shifter, the method comprising the steps of:

supplying a differential data signal to each of four paths of interference optical waveguides by a drive signal electrode portion, each of the two phase modulating portion having two arms, the four paths being comprised by the two arms of the two phase modulating portions, the differential data signal having an amplitude which is equal to a half-wave voltage $V\pi$ of the two phase modulating portions;

supplying a total of four data bias to each of the four paths by a data bias electrode portion;

supplying an orthogonal bias voltage to the phase shifter by an orthogonal bias electrode portion;

adjusting delay times in the two phase modulating portions by applying the data bias voltages to the data bias electrode portion, by a data bias power supply portion;

adjusting a delay amount relative to a light output from at least one of the two phase modulating portions by applying the orthogonal bias voltage to the orthogonal bias electrode portion, by an orthogonal bias power supply portion;

adding two or three dither signals to two or three of the four data bias voltages by a dither signal adding portion, the dither signals including first and second dither signals, the first dither signal being added to the first phase modulating portion, the second dither signal being added to the second phase modulating portion, a relative phase difference of the first and second dither signals being 90 degrees;

detecting a wave that is n-times a dither component from an output of the multiplexing portion by a dither detecting portion (where n is an integer equal to or greater than one);

receiving the two or three of the four data bias voltages to which the two or three dither signals are added, respectively, by two or three paths included in the four paths, and receiving one of the four data bias voltages by one path included in the four paths, the one of the four data bias voltages being free from a dither signal;

feeding back a detection result of the dither detecting portion to the orthogonal bias power supply portion by an orthogonal bias control portion; and adjusting the delay amount relative to the light output from at least one of the two phase modulating portions by controlling the orthogonal bias voltage to be applied to the orthogonal bias electrode portion based on feedback from the orthogonal bias control portion, by the orthogonal bias power supply portion.

6. A bias voltage control method for an optical signal transmitter comprising two phase modulating portions including first and second phase modulating portions, a phase shifter which displaces carrier phases of two output lights from the phase modulating portions by $\pi/2$, and a multiplexing portion which multiplexes two signal lights, carrier phases of two signal lights being made orthogonal to each other by the phase shifter, the method comprising the steps of:

supplying a differential data signal to each of four paths of interference optical waveguides by a drive signal electrode portion, each of the two phase modulating portion having two arms, the four paths being comprised by the two arms of the two phase modulating portions, the differential data signal having an amplitude which is smaller than a half-wave voltage $V\pi$ of the two phase modulating portions;

amplifying the differential data signal to be supplied to each of the four paths of the interference optical waveguides, by a drive amplifier;

adjusting an output amplitude of the drive amplifier so as to be smaller than the half-wave voltage $V\pi$ of the two phase modulating portions, by an amplitude control portion;

supplying a total of four data bias to each of the four paths by a data bias electrode portion;

supplying an orthogonal bias voltage to the phase shifter by an orthogonal bias electrode portion;

adjusting delay times in the two phase modulating portions by applying the data bias voltages to the data bias electrode portion, by a data bias power supply portion;

adjusting a delay amount relative to a light output from at least one of the two phase modulating portions by applying the orthogonal bias voltage to the orthogonal bias electrode portion, by an orthogonal bias power supply portion;

adding at least two dither signals to at least two of the four data bias voltages by a dither signal adding portion, the dither signal being asymmetric and having a different amplitude, the dither signals including first and second dither signals, the first dither signal being added to the first phase modulating portion, the second dither signal being added to the second phase modulating portion, a relative phase difference of the first and second dither signals being 90 degrees;

detecting a wave that is n-times a dither component from an output of the multiplexing portion by a dither detecting portion (where n is an integer equal to or greater than one);

feeding back a detection result of the dither detecting portion to the orthogonal bias power supply portion by an orthogonal bias control portion; and adjusting the delay amount relative to the light output from at least one of the two phase modulating portions by controlling the orthogonal bias voltage to be applied to the orthogonal bias electrode portion based on feedback from the orthogonal bias control portion, by the orthogonal bias power supply portion.

7. The optical signal transmitter according to claim 2, wherein the dither detecting portion detects an envelope of an output signal light of the multiplexing portion.

8. The optical signal transmitter according to claim 2, wherein a bandwidth of the two phase modulating portions, or a bandwidth of the drive amplifier, is an operating speed of half of a symbol rate.

9. The optical signal transmitter according to claim 1, wherein the four data bias voltages include: first and second data bias voltages mutually opposing each other; and third and fourth data bias voltages mutually opposing each other, the four paths include: two paths comprised by the two arms of the first phase modulating portion; and two paths comprised by the two arms of the second phase modulating portion, the first and second data bias voltages are supplied to the two paths comprised by the two arms of the first phase modulating portion, and the third and fourth data bias voltages are supplied to the two paths comprised by the two arms of the second phase modulating portion.

10. The optical signal transmitter according to claim 2, wherein the amplitude control portion limits outputs of the modulating portions to less than peaks of optical intensities.

11. The bias voltage control method according to claim 5, wherein the four data bias voltages include: first and second data bias voltages mutually opposing each other; and third and fourth data bias voltages mutually opposing each other, the four paths include: two paths comprised by the two arms of the first phase modulating portion; and two paths comprised by the two arms of the second phase modulating portion, the first and second data bias voltages are supplied to the two paths comprised by the two arms of the first phase modulating portion, and the third and fourth data bias voltages are supplied to the two paths comprised by the two arms of the second phase modulating portion.

12. The bias voltage control method according to claim 6, wherein the amplitude control portion limits outputs of the modulating portions to less than peaks of optical intensities.

* * * * *